US012744029B2

(12) United States Patent
Jia et al.

(10) Patent No.: US 12,744,029 B2
(45) Date of Patent: Sep. 22, 2026

(54) PHONEMES AND GRAPHEMES FOR NEURAL TEXT-TO-SPEECH

(71) Applicant: Google LLC, Mountain View, CA (US)

(72) Inventors: Ye Jia, Mountain View, CA (US); Byungha Chun, Tokyo (JP); Yu Zhang, Mountain View, CA (US); Jonathan Shen, Mountain View, CA (US); Yonghui Wu, Fremont, CA (US)

(73) Assignee: Google LLC, Mountain View, CA (US)

( * ) Notice: Subject to any disclaimer, the term of this patent is extended or adjusted under 35 U.S.C. 154(b) by 91 days.

(21) Appl. No.: 18/746,809

(22) Filed: Jun. 18, 2024

(65) Prior Publication Data

US 2024/0339106 A1 Oct. 10, 2024

Related U.S. Application Data

(63) Continuation of application No. 17/643,684, filed on Dec. 10, 2021, now Pat. No. 12,020,685.

(Continued)

(51) Int. Cl.
*G10L 13/08* (2013.01)
*G06F 40/263* (2020.01)

(Continued)

(52) U.S. Cl.
CPC .......... *G10L 13/086* (2013.01); *G06F 40/263* (2020.01); *G06F 40/279* (2020.01); *G06N 3/08* (2013.01); *G10L 13/047* (2013.01)

(58) Field of Classification Search
CPC ... G10L 13/086; G10L 13/047; G06F 40/279; G06F 40/263; G06N 3/08
See application file for complete search history.

(56) References Cited

U.S. PATENT DOCUMENTS

2007/0112569 A1 5/2007 Wang et al.
2018/0247636 A1* 8/2018 Arik .................... G10L 13/08

(Continued)

OTHER PUBLICATIONS

Kyle Kastner, Joao Felipe Santos, Yoshua Bengio, Aaron Courville, "Representation Mixing for TTS Synthesis", Nov. 24, 2018, arXiv: 1811.07240 (Year: 2018).*

(Continued)

*Primary Examiner* — Pierre Louis Desir
*Assistant Examiner* — Daniel W Chung
(74) *Attorney, Agent, or Firm* — Honigman LLP; Brett A. Krueger; Grant Griffith

(57) ABSTRACT

A method includes receiving a text input including a sequence of words represented as an input encoder embedding. The input encoder embedding includes a plurality of tokens, with the plurality of tokens including a first set of grapheme tokens representing the text input as respective graphemes and a second set of phoneme tokens representing the text input as respective phonemes. The method also includes, for each respective phoneme token of the second set of phoneme tokens: identifying a respective word of the sequence of words corresponding to the respective phoneme token and determining a respective grapheme token representing the respective word of the sequence of words corresponding to the respective phoneme token. The method also includes generating an output encoder embedding based on a relationship between each respective phoneme token and the corresponding grapheme token determined to represent a same respective word as the respective phoneme token.

20 Claims, 7 Drawing Sheets

Related U.S. Application Data

(60) Provisional application No. 63/166,929, filed on Mar. 26, 2021.

(51) Int. Cl.

| | |
|---|---|
| ***G06F 40/279*** | (2020.01) |
| ***G06N 3/08*** | (2023.01) |
| ***G10L 13/047*** | (2013.01) |

(56) References Cited

U.S. PATENT DOCUMENTS

2022/0020355 A1* 1/2022 Ming .................... G06F 40/205
2022/0246136 A1* 8/2022 Yang ...................... G06N 3/094

OTHER PUBLICATIONS

ST-BERT: Cross-Modal Langauge Model Pre-Training for End-to-End Spoken Language Understanding, Oct. 23, 2020, arXiv: 2010.12283v2 (Year: 2020) (Year: 2020).*

Kyle Kastner, Joao Felipe Santos, Yoshua Bengio, Aaron Courville, "Representation Mixing for TTS Synthesis", Nov. 24, 2018, arXiv: 1811.07240 (Year: 2019).*

ST-BERT: Cross-Modal Langauge Model Pre-Training for End-to-End Spoken Language Understanding, Oct. 23, 2020, arXiv: 2010.12283v2 (Year: 2020).*

Zhehuai Chen, Mahaveer Jain, Yongqiang Wang, Michael L. Seltzer, Christian Fuegen, "Joint Grapheme and Phoneme Embeddings for Contextual End-to-End ASR", Interspeech 2019 (Year: 2019).*

Apr. 5, 2022 Written Opinion (WO) of the International Searching Authority (ISA) and International Search Report (ISR) issued in International Application No. PCT/US2021/062837.

Chung Yu-An et al.: "Semi-supervised Training for Improving Data Efficiency in End-to-end Speech Synthesis", ICASSP 2019—2019 IEEE International Conference on Acoustics, Speech and Signal Processing (ICASSP), IEEE, May 12, 2019 (May 12, 2019), pp. 6940-6944, XP033566409, DOI: 10.1109/ICASSP.2019.8683862.

Kastner Kyle et al: "Representation Mixing for TTS Synthesis", ICASSP 2019—2019 IEEE International Conference on Acoustics, Speech and Signal Processing (ICASSP), IEEE, May 12, 2019 (May 12, 2019), pp. 5906-5910, XP033565457,DOI: 10.1109/ICASSP.2019.8682880.

Ye Jia et al: "PnG BERT: Augmented BERT on Phonemes and Graphemes for Neural TTS", arxiv.org, Cornell University Library, 201 Olin Library Cornell University Ithaca, Ny 14853, Jun. 7, 2021 (Jun. 7, 2021), XP081980096.

Jacob Devlin et al. "Bert: Pre-training of deep bidirectional transformers for language understanding." arXiv preprint arXiv:1810.04805 (2018).

Minjeong Kim et al. "St-bert: Cross-modal language model pre-training for end-to-end spoken language understanding." ICASSP 2021-2021 IEEE International Conference on Acoustics, Speech and Signal Processing (ICASSP). IEEE, 2021.

Chinese Office Action for the related Application No. 202180096396.2 dated May 27, 2026.

* cited by examiner

PHONEMES AND GRAPHEMES FOR NEURAL TEXT-TO-SPEECH

CROSS REFERENCE TO RELATED APPLICATIONS

This U.S. patent application is a continuation of, and claims priority under 35 U.S.C. § 120 from, U.S. patent application Ser. No. 17/643,684, filed on Dec. 10, 2021, which claims priority under 35 U.S.C. § 119(e) to U.S. Provisional Application 63/166,929, filed on Mar. 26, 2021. The disclosures of these prior applications are considered part of the disclosure of this application and are hereby incorporated by reference in their entireties.

TECHNICAL FIELD

This disclosure relates to phenomes and graphemes for neural text-to-speech (TTS).

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). Speech synthesis systems have evolved from concatenative and parametric synthesis models to models with neural networks. This evolution has significantly improved the naturalness of synthesized speech, but TTS models today are still unable to fully preserve the input text fed into the TTS model to generate the synthesized speech. That is, most TTS models, even neural network TTS models, translate the input text into a phoneme representation without preserving the corresponding graphemes. Due to the lack of graphemes, TTS models cannot take advantage of the relationship between phonemes and graphemes to further improve the functionality of TTS models.

SUMMARY

One aspect of the disclosure provides a computer-implemented method for implementing phenome and grapheme tokens for neural text-to-speech synthesis. The computer-implemented method when executed on data processing hardware causes the data processing hardware to perform operations including receiving, at an encoder of a speech synthesis model, a text input including a sequence of words represented as an input encoder embedding. The input encoder embedding includes a plurality of tokens, with the plurality of tokens including a first set of grapheme tokens representing the text input as respective graphemes and a second set of phoneme tokens representing the text input as respective phonemes. The operations also include, for each respective phoneme token of the second set of phoneme tokens: identifying a respective word of the sequence of words corresponding to the respective phoneme token and determining a respective grapheme token representing the respective word of the sequence of words corresponding to the respective phoneme token. The operations also include generating, by the encoder, an output encoder embedding based on a relationship between each respective phoneme token and the corresponding grapheme token determined to represent a same respective word as the respective phoneme token.

Implementations of the disclosure may include one or more of the following optional features. In some implementations, identifying, by the encoder, the respective word of the sequence of words corresponding to the respective phoneme token includes identifying a position in the respective word corresponding to the respective phoneme token and determining, by the encoder, the respective grapheme token representing the respective word of the sequence of words corresponding to the respective phoneme token includes determining the respective grapheme token representing the respective word of the sequence of words corresponding to the respective phoneme token at the position in the respective word corresponding to the respective phoneme token.

In some examples, each token of the plurality of tokens of the input encoder embedding represents a combination of one of a grapheme token embedding or a phoneme token embedding, a segment embedding, a word position embedding, and/or a position embedding. In these examples, identifying the respective word of the sequence of words corresponding to the respective phoneme token may include identifying the respective word of the sequence of words corresponding to the respective phoneme token based on a respective word position embedding associated with the respective phoneme token. Here, determining the respective grapheme token representing the respective word of sequence of words corresponding to the respective phoneme token may include determining that the respective grapheme token includes a corresponding word position embedding that matches the respective word position embedding of the respective phoneme token.

In some implementations, the speech synthesis model includes an attention mechanism in communication with the encoder. The speech synthesis model may include a duration-based upsampler in communication with the encoder. Further, the plurality of tokens of the input encoder embedding may include a special token identifying a language of the input text.

The operations may also include pre-training the encoder of the speech synthesis model by: feeding the encoder a plurality of training examples, each training example represented as a sequence of training grapheme tokens corresponding to a training sequence of words and a sequence of training phoneme tokens corresponding to the same training sequence of words; masking a training phoneme token from the sequence of training phoneme tokens for a respective word from the training sequence of words; and masking a training grapheme token from the sequence of training phoneme tokens for the respective word from the training sequence of words.

In some implementations, the speech synthesis model includes a multilingual speech synthesis model and the operations further include pre-training the encoder of the speech synthesis model using a classification objective to predict a classification token of the plurality of tokens of the input encoder embedding, the classification token including a language identifier. In other implementations, the speech synthesis model includes a multilingual speech synthesis model and the output encoder embedding includes a sequence of encoder tokens, wherein each encoder token includes language information about the input text.

In still other implementations, the speech synthesis model includes a multi-accent speech synthesis model and the operations further include pre-training the encoder of the speech synthesis model using a classification objective to predict a classification token of the plurality of tokens of the input encoder embedding, wherein the classification token includes an accent identifier.

Another aspect of the disclosure provides a system for implementing phenome and grapheme tokens for neural text-to-speech synthesis. The system includes data processing hardware and memory hardware in communication with the data processing hardware. The memory hardware stores instructions that when executed on the data processing hardware causes the data processing hardware to perform operations including receiving, at an encoder of a speech synthesis model, a text input including a sequence of words represented as an input encoder embedding. The input encoder embedding includes a plurality of tokens, with the plurality of tokens including a first set of grapheme tokens representing the text input as respective graphemes and a second set of phoneme tokens representing the text input as respective phonemes. The operations also include, for each respective phoneme token of the second set of phoneme tokens: identifying a respective word of the sequence of words corresponding to the respective phoneme token and determining a respective grapheme token representing the respective word of the sequence of words corresponding to the respective phoneme token. The operations also include generating, by the encoder, an output encoder embedding based on a relationship between each respective phoneme token and the corresponding grapheme token determined to represent a same respective word as the respective phoneme token.

This aspect may include one or more of the following optional features. In some implementations, identifying, by the encoder, the respective word of the sequence of words corresponding to the respective phoneme token includes identifying a position in the respective word corresponding to the respective phoneme token and determining, by the encoder, the respective grapheme token representing the respective word of the sequence of words corresponding to the respective phoneme token includes determining the respective grapheme token representing the respective word of the sequence of words corresponding to the respective phoneme token at the position in the respective word corresponding to the respective phoneme token.

In some examples, each token of the plurality of tokens of the input encoder embedding represents a combination of one of a grapheme token embedding or a phoneme token embedding, a segment embedding, a word position embedding, and/or a position embedding. In these examples, identifying the respective word of the sequence of words corresponding to the respective phoneme token may include identifying the respective word of the sequence of words corresponding to the respective phoneme token based on a respective word position embedding associated with the respective phoneme token. Here, determining the respective grapheme token representing the respective word of sequence of words corresponding to the respective phoneme token may include determining that the respective grapheme token includes a corresponding word position embedding that matches the respective word position embedding of the respective phoneme token.

In some implementations, the speech synthesis model includes an attention mechanism in communication with the encoder. The speech synthesis model may include a duration-based upsampler in communication with the encoder. Further, the plurality of tokens of the input encoder embedding may include a special token identifying a language of the input text.

The operations may also include pre-training the encoder of the speech synthesis model by: feeding the encoder a plurality of training examples, each training example represented as a sequence of training grapheme tokens corresponding to a training sequence of words and a sequence of training phoneme tokens corresponding to the same training sequence of words; masking a training phoneme token from the sequence of training phoneme tokens for a respective word from the training sequence of words; and masking a training grapheme token from the sequence of training phoneme tokens for the respective word from the training sequence of words.

In some implementations, the speech synthesis model includes a multilingual speech synthesis model and the operations further include pre-training the encoder of the speech synthesis model using a classification objective to predict a classification token of the plurality of tokens of the input encoder embedding, the classification token including a language identifier. In other implementations, the speech synthesis model includes a multilingual speech synthesis model and the output encoder embedding includes a sequence of encoder tokens, wherein each encoder token includes language information about the input text.

In still other implementations, the speech synthesis model includes a multi-accent speech synthesis model and the operations further include pre-training the encoder of the speech synthesis model using a classification objective to predict a classification token of the plurality of tokens of the input encoder embedding, wherein the classification token includes an accent identifier.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
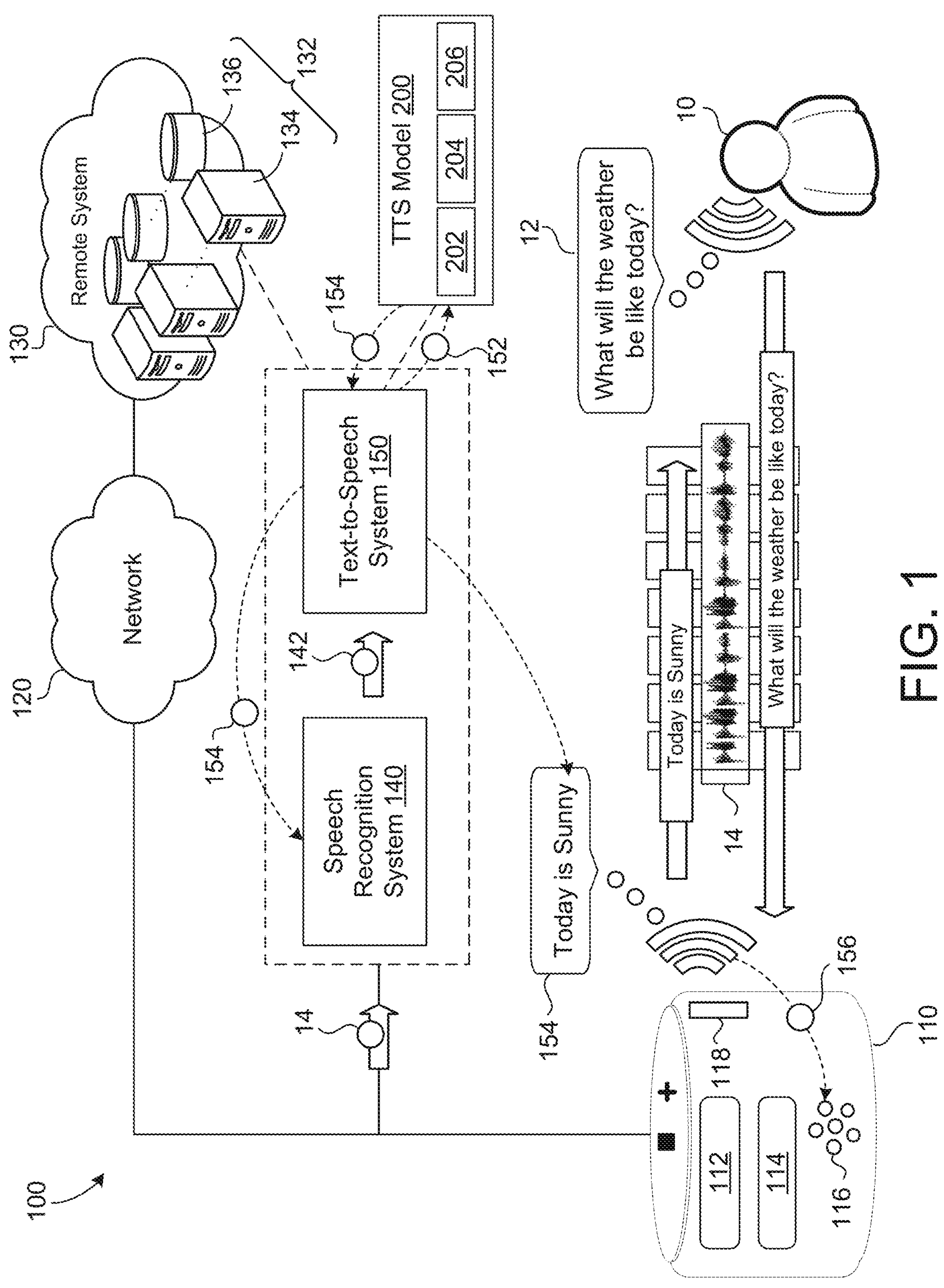
FIG. 1 is a schematic view of an example speech environment.

Fast-paced development of neural end-to-end text-to-speech (TTS) synthesis has enabled the generation of speech to approach human levels of naturalness. The neural network of these TTS systems generally includes an encoder that encodes an input text representation into hidden states and a decoder that decodes spectrogram frames or waveform samples from the hidden states. These TTS systems may then use either an attention or a duration-based upsampler to connect the encoder to the decoder.

During development of these TTS systems, the form of the input to the neural network that represents the text has evolved. For example, early TTS systems would receive purely characters of the input text as the input to the neural network. Yet over time, it was discovered that TTS systems may achieve better stability if, instead of purely characters, the input to the neural network was phonemes (i.e., how a text representation is pronounced). Unfortunately, phoneme-based TTS models are not without their setbacks. For instance, one obvious issue with phoneme-based models occurs when a pronunciation of two words is the same, but these two words actually have different meaning; that is, a homophone. To illustrate, the sentence "To cancel the payment, press one; or to continue, two," is an example of a homophone, which may be frequently used by conversational AI agents for call centers. In the phoneme representation of this sentence, the trailing " . . . , two," can easily be confused with " . . . , too," since "too" is a word that occurs more frequently in regular English. That is, a predictive system is more likely to output the word "too" even though "two" is the intention. In this example, different prosodies are expected in natural speech at the comma position in the two patterns. A moderate pause is expected at the comma in the case of " . . . , two" while often there is no pause for the pattern " . . . , too." When a TTS model is phoneme-based, the phoneme inputs to the neural network for the textual representation of this example sentence lack the written context of the sentence to ensure a consistently accurate output; an output where the synthesized speech has a pause after the comma to enable the synthesized speech to sound like the input sentence.

To overcome such setbacks with phoneme-based models, it would therefore be advantageous to have the input to the neural network of the TTS model include both phonemes and graphemes. That is, the input is a representation of the pronunciation of the text for the input (i.e., a phoneme) as well as a representation of how the text is written (i.e., a grapheme). Ideally, the inclusion of graphemes would reduce or eliminate issues stemming from pronunciation ambiguity (e.g., homophones). Yet, producing an input for a neural network that includes both phonemes and graphemes is not as straightforward as it may sound. One complexity is that a phoneme and a grapheme may represent the same content, but at varying lengths. For example, a word in a sentence may have two subwords or graphemes, but only a single phoneme or, in a converse example, a word in a sentence may have one subword or grapheme (e.g., the subword is the same as the word) and two phonemes. Therefore, a first sequence of phonemes representing a sentence would have inherent alignment issues with a second sequence of graphemes that represent the same sentence.

Even though this problem exists, some approaches have tried to combine phoneme and grapheme representations for the input. Instead of proposing a solution to this alignment issue, these approaches tend to generally avoid the issue. For example, one approach is to combine the phoneme and grapheme representations at the word level by concatenating grapheme-based embeddings with phoneme embeddings. Since these approaches do not handle the alignment challenges between phonemes and grapheme-based tokens (i.e., at the sub-word level), these approaches do not fully exploit the phoneme-grapheme relationship. Meaning that, these approaches limit the potential that the incorporation of graphemes may offer the TTS model (e.g., in terms of accuracy).

To address the issues with previous approaches, the current technique described herein accounts for the alignment (or misalignment) between phonemes and graphemes. More particularly, the approach represents the alignment relationship between phoneme tokens and grapheme tokens (i.e., at the sub-word or tokenized level) over the entirety of the text represented as the input to the neural network (i.e., the input to the encoder of the neural network). This approach is similar to an encoder for a Bidirectional Encoder Representations from Transformers (BERT) model (e.g., described in Devlin, *BERT: Pre-training of Deep Bidirectional Transformers for Language Understanding*, available at arxiv.org/pdf/1810.04805v2.pdf, and incorporated herein by reference). In a traditional BERT model, the encoder received inputs corresponding to multiple sentences (i.e., segments) that are identified by a segment identifier (ID). The input to the BERT represented the multiple sentences as a sum of a phoneme-based token embedding, a segment embedding, and a position embedding. Although similar in some respects, the current technique may be considered an augmented BERT or PnG BERT because this technique includes phonemes and graphemes for the token embedding. To account for the graphemes at the token-level, the augmented BERT not only includes the token embedding, the segment embedding, and the position embedding, of the traditional BERT, but also includes a word-position embedding that provides word-level alignment between phonemes and graphemes. Therefore, the input to the augmented BERT is a representation of four types of embeddings while the traditional BERT only included three types of embeddings without any representation for the graphemes.

Since the augmented BERT approach represents the phoneme-grapheme relationship as an input to the encoder of the neural network, this augmented BERT encoder (also referred to as an augmented encoder) may be used in different types of TTS models. That is, since neural networks are typically encoder-decoder structures with either attention or duration-based upsampling, the augmented encoder may replace encoders in other encoder-decoder structures for TTS models. This means that the augmented encoder is compatible with both attention-based neural networks and duration-based neural networks without any significant modification. Therefore, functionally speaking, the augmented encoder may be used in monolingual TTS models, locale TTS models, multilingual TTS models, and/or multi-accent TTS models.

Another reason that the current technique builds on the BERT model is that BERT is a model architecture that uses pre-training to improve its natural language processing. Generally speaking, that pre-training is self-supervised pre-training on a large text corpora using objectives, such as a language model (LM) or a masked-language model (MLM). For a traditional BERT, the pre-training was performed only on graphemes (at the sub-word level) or at the sentence level. Pre-training is traditionally not done on phonemes. Since the augmented BERT is able to model a relationship between the phonemes and graphemes, this relationship may also be translated to pre-training such that the augmented BERT may pre-train on both phonemes and graphemes.

Referring to FIG. 1, in some implementations, a speech environment 100 includes a user 10 communicating a spoken utterance 12 to a speech-enabled device 110 (also referred to as a device 110 or a user device 110). The user 10 (i.e., speaker of the utterance 12) may speak the utterance 12 as a query or a command to solicit a response from the device 110 or to have the device 110 execute a task specified by the query. The device 110 is configured to capture sounds from one or more users 10 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 (e.g., a digital assistant interface) may field the query for the command by answering the query and/or causing the command to be performed.

Here, the device 110 captures audio data 14 corresponding to the spoken utterance 12 by the user 10. The device 110 may correspond to any computing device associated with the user 10 and capable of receiving audio data 14. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech and/or text processing. In some examples, the device 110 includes one or more applications (i.e., software applications) where each application may utilize one or more speech processing systems 140, 150, 200 associated with device 110 to perform various functions within the application. For instance, the device 110 includes an assistant application configured to communicate synthesized playback audio 154 (also referred to as synthesized speech 154) to the user 10 to assist the user 10 with various tasks.

The device 110 further includes an audio subsystem with an audio capturing device (e.g., a microphone) 116 for capturing and converting audio data 14 within the speech environment 100 into electrical signals and a speech output device (e.g., a speaker) 118 for communicating an audible audio signal (e.g., a synthesized playback signal 154 from the device 110). While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or synthesized playback communication. For instance, the device 110 is configured to perform speech recognition using a speech recognition system 140 and/or conversion of text-to-speech using a TTS system 150 (e.g., using the TTS model 200). These systems 140, 150, 200 may reside on the device 110 (referred to as on-device systems) or reside remotely (e.g., reside on the remote system 130), but in communication with the device 110. In some examples, some of these systems 140, 150, 200 reside locally or on-device while others reside remotely. In other words, any of these systems 140, 150, 200 may be local or remote in any combination. For instance, when a system 140, 150, 200 is rather large in size or processing requirements, the system 140, 150, 200 may reside in the remote system 130. Yet when the device 110 may support the size or the processing requirements of one or more systems 140, 150, 200, the one or more systems 140, 150, 200 may reside on the device 110 using the data processing hardware 112 and/or the memory hardware 114. Optionally, the one or more of the systems 140, 150, 200 may reside on both locally/on-device and remotely. For instance, one or more of the systems 140, 150, 200 may default to execute on the remote system 130 when a connection to the network 120 between the device 110 and remote system 130 is available, but when the connection is lost or the network 120 is unavailable, the systems 140, 150, 200 instead execute locally on the device 110.

A speech recognition system 140 receives audio data 14 as an input and transcribes that audio signal into a transcription 142 as an output. Generally speaking, by converting the audio data 14 into a transcription 142, the speech recognition system 140 allows the device 110 to recognize when a spoken utterance 12 from the user 10 corresponds to a query, a command, or some other form of audio communication. The transcription 142 refers to a sequence of text that the device 110 may then use to generate a response to the query or the command. For instance, if the user 10 asks the device 110 the question of "what will the weather be like today," the device 110 passes the audio data 14 corresponding to the question "what will the weather be like today" to the speech recognition system 140. The speech recognized system 140 converts the audio data 14 into a transcript that includes the text of "what will the weather be like today?" The device 110 may then determine a response to the query using the text or portions of the text. For instance, in order to determine the weather for the current day (i.e., today), the device 110 passes the text (e.g., "what will the weather be like today?") or identifying portions of the text (e.g., "weather" and "today") to a search engine. The search engine may then return one or more search results that the device 110 interprets to generate a response for the user 10.

In some implementations, the device 110 or a system associated with the device 110 identifies text 152 (also referred to as a sequence of text 152 or input text 152) that the device 110 will communicate to the user 10 as a response to a query of the spoken utterance 12. The device 110 may then use the TTS system 150 to convert the text 152 into corresponding synthesized playback audio 154 for the device 110 to communicate to the user 10 (e.g., audibly communicate to the user 10) as the response to the query of the spoken utterance 12. In other words, the TTS system 150 receives, as input, text 152 and converts the text 152 to an output of synthesized playback audio 154 (e.g., through a series of neural networks) where the synthesized playback audio 154 is an audio signal defining an audible rendition of the text 152. For example, the playback audio 154 is a verbalization or a narration of the input text 152. In some examples, the input text 152 refers to a sequence of text or characters in a particular natural language (e.g., English, Spanish, or French). The sequence of characters can include letters, numbers, punctuation marks, and/or other special characters. When the TTS system 150 generates the playback audio 154, the playback audio 154 is synthesized speech in that it approximates how a human would verbalize the sequence of characters defining the input text 152.

The TTS system 150 (or other speech synthesis system) includes a TTS model 200 (e.g., the TTS model 200 of FIG. 2) that utilizes a deep neural network to generate the synthesized playback audio 154. The TTS model 200 processes embeddings that are encoded representations of speech features (e.g., features of the input text 152) to generate audio waveforms (e.g., time-domain audio waveforms that define an audio signal's amplitude over time). Once generated, the TTS system 150 communicates the synthesized playback audio 154 to the device 110 to allow the device 110 to output the synthesized playback audio 154. For instance, the device 110 outputs the synthesized playback audio 154 of "today is sunny" at a speaker 118 of the device 110. Here, the TTS model 200 of the TTS system 150 is configured to control the speech-related attributes of the synthesized speech 154. In other words, the TTS model 200 is configured to simulate the voice of a human speaker in terms of naturalness while also being able to generate diverse synthesize speech by modeling fine-grained latent features. Although FIG. 1 depicts an example of a TTS system 150 in the context of an assistant application, the TTS system 150 (e.g., using the TTS model 200) is applicable in other text-to-speech scenarios, such as, for example, navigation or reading documents.

Figure 2A:
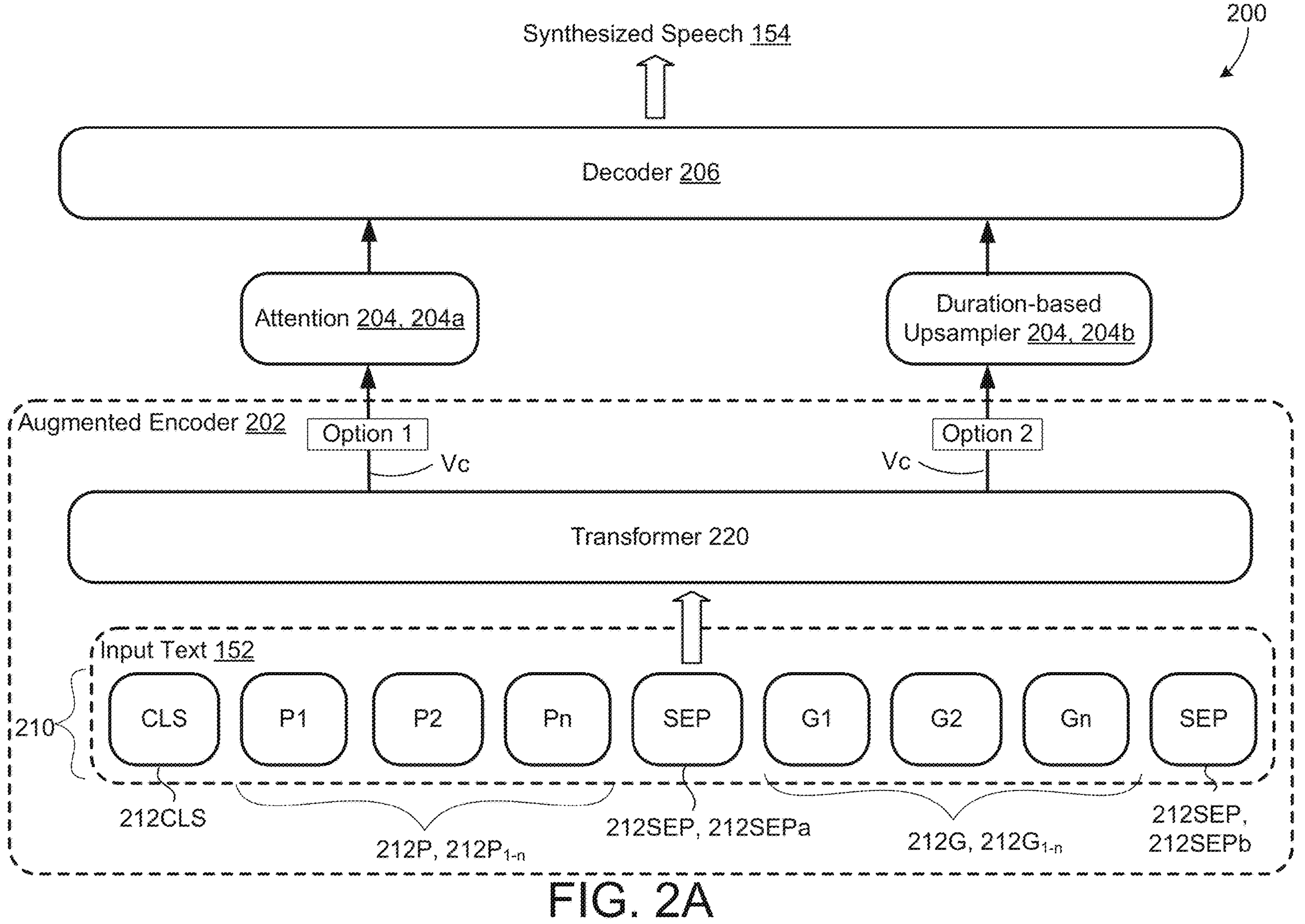
FIGS. 2A-2C are schematic views of example augmented encoders for a text-to-speech model.
Figure 2B:
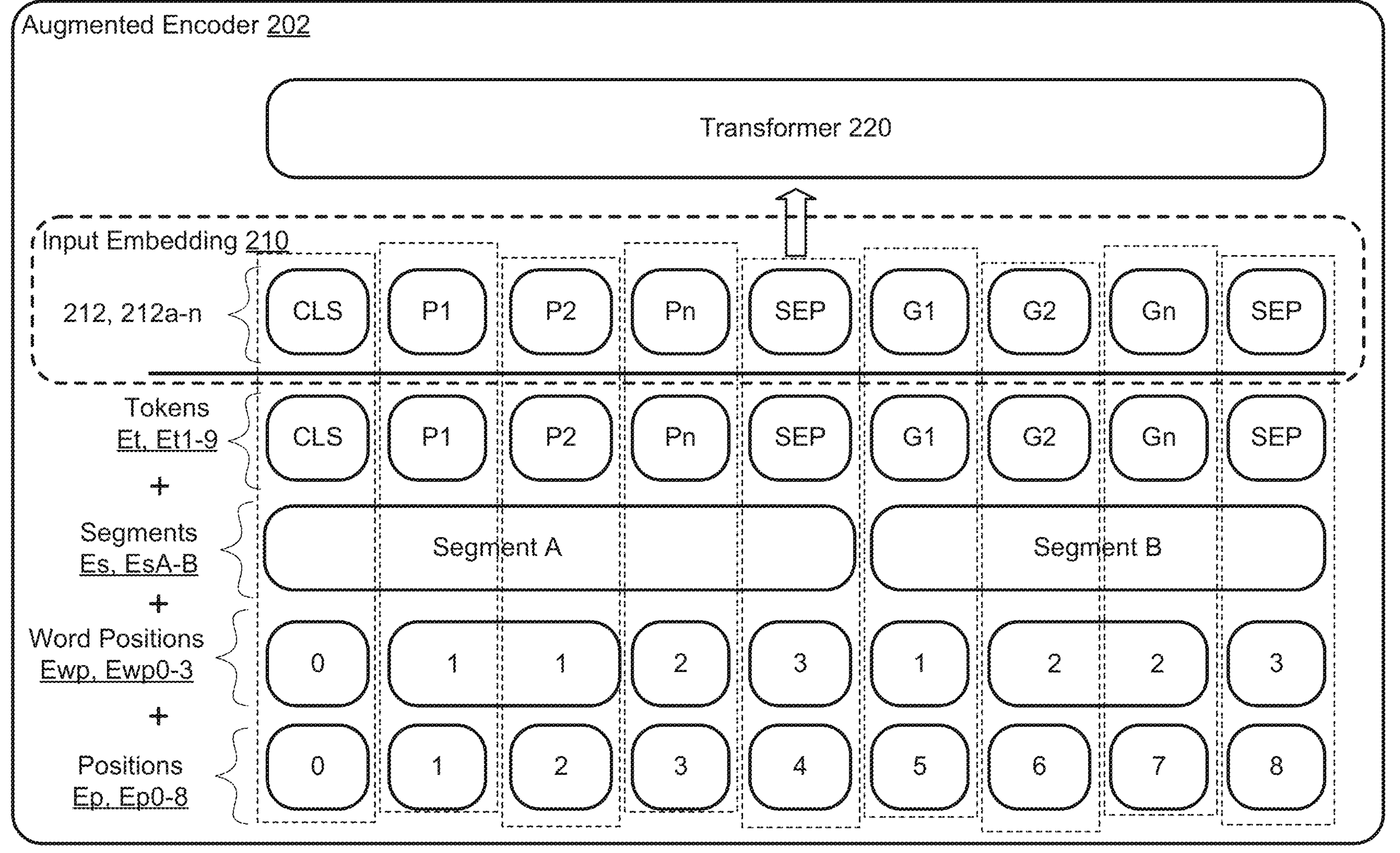
Figure 2C:
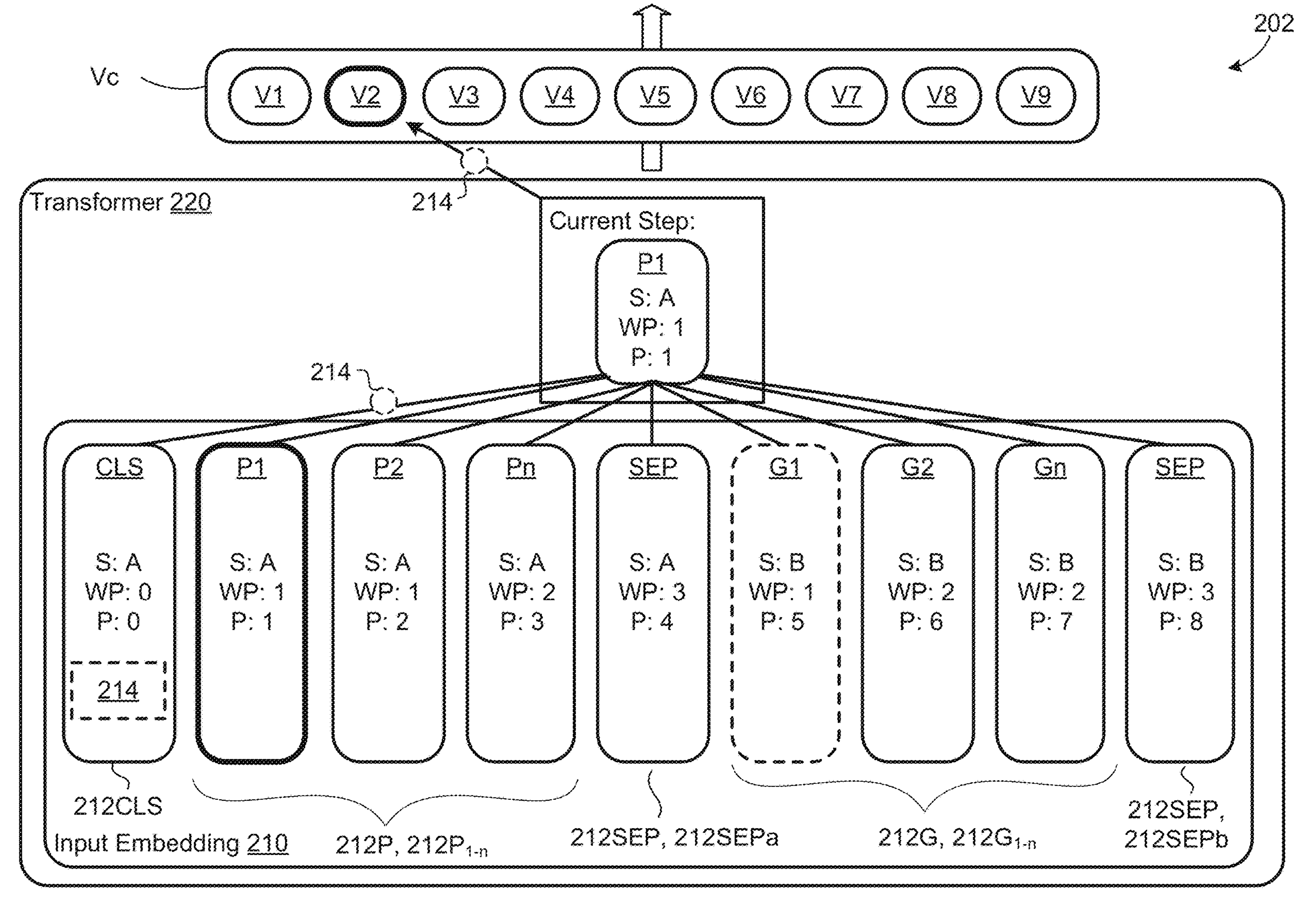

Referring to FIGS. 2A-2C, the TTS model 200 includes an augmented encoder 202, an adapter 204, and a decoder 206. The augmented encoder 202 receives text 152 as an input that is converted to an input embedding 210 for a transformer 220 to encode into a context vector Vc. Generally speaking, encoder-decoder architecture uses adapters 204 because the lengths of the input sequence and the output sequence for the decoder 206 are different. Therefore, the adapter 204 functions as a mechanism that addresses how the input sequence corresponds to the output sequence. For instance, how many audio frames correspond to a token of a context vector Vc. As shown in FIG. 2A, there are two options of adapters 204, 204*a-b*. For the first option, a first adapter 204*a* uses attention (generally referred to as an attention-based TTS model) to provide the context vector Vc in a compatible form for the decoder 206 to decode into synthesized speech 154 (e.g., a spectrogram or waveform). For the second option, a second adapter 204*b* performs duration-based upsampling (referred to as a duration-based TTS model) instead of attention on the context vector Vc to provide the context vector Vc in a compatible form for the decoder 206 to decode into synthesized speech 154.

To form the input embedding 210, the TTS model 200 functions similarly to the BERT model as previously described in that the input embedding 210 is a combination of embeddings E that represent the input text 152. In some implementations, the input embedding 210 corresponds to a sequence of words (e.g., a sentence or multiple sentences) represented as a plurality of tokens 212, 212*a-n* or sequence of tokens 212. The plurality of tokens 212 include a first set of phoneme tokens 212, 212$P_{1\text{-}n}$ representing the text input 152 and a second set of graphemes tokens 212G, 212$G_{1\text{-}n}$ also representing the text input 152. That is, both the first set and the second set of tokens 212 represent the same text input 152. Therefore, if the input text 152 is the sentence "My dog is cute," the first set of phoneme tokens 212P represents the sentence "my dog is cute" as phoneme tokens 212P and the second set of grapheme tokens 212G represents that same sentence "my dog is cute" as grapheme tokens 212G. Here, the phoneme tokens 212P may refer to International Phonetic Alphabet (IPA) phonemes while the grapheme tokes 212G may correspond to subword units. Similar to the original BERT model, the plurality of tokens 212 may also include special tokens shown as a CLS token 212, 212CLS and a SEP token 212, 212SEP. The CLS token 212CLS is a special token that may be prepended to the first segment (i.e., sentence) or leading segment for the tokens 212 while the SEP token 212SEP functions as a separator appended to each segment to indicate where one segment ends and another segment begins. For example, when the input text 152 includes two sentences represented as two segments, the sequence of tokens 212 would include an SEP token 212SEP separating the two segments (e.g., as shown in FIGS. 2A-2C). In some configurations, all the tokens representing the input text 152 share the same identifier (ID) space for purposes of embedding lookup and masked language modeling (MLM) classification.

In some examples, unlike the original BERT which uses a combination of three types of embeddings (e.g., a token embedding, a segment embedding, and a position embedding) to form the input embedding, the augmented encoder 202 forms the input embedding 210 from four types of embeddings E. For example, the augmented encoder 202 uses four types of embeddings E rather than three types of embeddings E to provide the alignment context for the augmented encoder 202 to incorporate graphemes in addition to phonemes. Referring to FIG. 2B, the input embedding 210 represents the sum of a position embedding E, Ep, a word position embedding E, Ewp, a segment embedding E, Es, and a token embedding E, Et. Here, the word position embedding Ewp differs from the position embedding Ep in that the position embedding is an overall index of position for the plurality of tokens 212. Whereas, the word position embedding Ewp represents a position at a sub-word level (i.e., where in a word of a segment a token occurs). By including a word position embedding Ewp, the input embedding 210 is able to represent, for example, that a second phoneme in a sentence corresponds to a first word in a second wordpiece (i.e., word position) of the first word while also representing that the second grapheme for that same sentence corresponds to a second word in the sentence. Meaning that, the alignment between a phoneme and a grapheme is represented in the input embedding 210.

FIG. 2B illustrates a vertical dotted box around each individual token 212 of the input embedding 210 (i.e., a tokenized step of the input embedding 210) to depict that each token 212 of the input embedding 210 is the combination of a position embedding E, Ep, a word position embedding E, Ewp, a segment embedding E, Es, and a token embedding E, Et. Here, the position embedding Ep refers to an overall or global location for a token step with respect to the input embedding 210 (e.g., the entire current input embedding 210). In FIG. 2B, there are nine positions or tokenized steps starting from an index of zero. The word position embedding Ewp refers to which word that a token 212 corresponds to in a sequence of words from the input text 152. FIG. 2B has an input text 152 of three words. The segment embedding Es identifies which phrase or sentence corresponds to a token 212. With the augmented encoder 202 having an input corresponding to graphemes and phonemes, the input text 152 includes at least two segments for each single segment of input text 152. In other words, each segment of the input text 152 is repeated twice, once as a phoneme segment (shown in FIG. 2B as segment A) and once as a grapheme segment (shown in FIG. 2B as segment B). Accordingly, if the input text 152 was two or four sentences, meaning two or four segments for a traditional BERT, the input embedding 210 for the augmented encoder 202 would be four segments or eight segments respectively (i.e., each sentence represented once as graphemes and once as phonemes). Additionally, the tokens embeddings Et forming the input embedding 210 correspond to sub-unit representations of the words of a segment (or sentence). As previously stated, the phoneme tokens may be individual IPA phonemes while the grapheme tokens are wordpiece subwords.

With continued reference to FIG. 2B, each token 212 of the input embedding 210 is shown in a vertical dotted box to illustrate that a respective token 212 is a combination of multiple embeddings E. The first token 212*a* of the input embedding 210 is a combination of a first token embedding Et, Et1 of the CLS token, a first segment embedding Es, EsA, a first word position embedding Ewp, Ewp0, and a first position embedding Ep, Ep0. The second token 212*b* corresponding to the first phoneme token 212*p*1 in the set of phoneme tokens 212P for the input embedding 210 is a combination of a second token embedding Et, Et2 of the phoneme token P1, the first segment embedding Es, EsA, a second word position embedding Ewp, Ewp1, and a second position embedding Ep, Ep1. The third token 212*c* corresponding to the second phoneme token 212*p*2 in the set of phoneme tokens 212P for the input embedding 210 is a combination of a third token embedding Et, Et3 of the phoneme token P2, the first segment embedding Es, EsA, a second word position embedding Ewp, Ewp1, and a third position embedding Ep, Ep2. The fourth token 212*d* corresponding to the nth phoneme token 212*pn* in the set of phoneme tokens 212P for the input embedding 210 is a combination of a nth token embedding Et, Et4 of the phoneme token Pn, the first segment embedding Es, EsA, a third word position embedding Ewp, Ewp2, and a fourth position embedding Ep, Ep3. The fifth token 212*e* corresponding to the SEP token 212SEP for the input embedding 210 is a combination of a fifth token embedding Et, Et5 of the SEP token SEP, the first segment embedding Es, EsA, a third word position embedding Ewp, Ewp3, and a fifth position embedding Ep, Ep4. The sixth token 212*f* corresponding to the first grapheme token 212G1 of the second set of grapheme tokens 212G for the input embedding 210 is a combination of a sixth token embedding Et, Et6 of the grapheme token G1, a second segment embedding Es, EsB, the first word position embedding Ewp, Ewp1, and a sixth position embedding Ep, Ep4. The seventh token 212*g* corresponding to the second grapheme token 212G2 of the second set of grapheme tokens 212G for the input embedding 210 is a combination of a seventh token embedding Et, Et7 of the grapheme token G2, the second segment embedding Es, EsB, the second word position embedding Ewp, Ewp2, and a seventh position embedding Ep, Ep7. The eighth token 212*h* corresponding to the nth grapheme token 212Gn of the second set of grapheme tokens 212G for the input embedding 210 is a combination of a eighth token embedding Et, Et7 of the grapheme token Gn, the second segment embedding Es, EsB, the second word position embedding Ewp, Ewp2, and an eighth position embedding Ep, Ep8. The ninth token 212*i* corresponding to a second SEP token 212SEP (e.g., indicating the end of the second segment) for the input embedding 210 is a combination of a ninth token embedding Et, Et9 of the CEP token, the second segment embedding Es, EsB, the third word position embedding Ewp, Ewp3, and a ninth position embedding Ep, Ep9. Here, since segment A and segment B are for the same sentence, embeddings E that represent the first word position (e.g., the first word position embedding Ewp1) for a phoneme token 212P of the input embedding 210 are the same as embeddings E that represent the first word position (e.g., the first word position embedding Ewp1) for a grapheme token 212G; indicating that the grapheme and phoneme token 212 occur at the same word-piece level.

In some examples, the transformer 220 of the augmented encoder 202 receives the input encoder embedding 210 and generates the context vector Vc as an output of the augmented encoder 202 (also referred to as an output encoder embedding Vc). Much like the input encoder embedding 210, the output encoder embedding or context vector Vc may also be a sequence of output tokens (e.g., shown as V1-V9) based on the input tokens 212. Referring to FIG. 2C, in some implementations, the transformer 220 is configured to receive the input encoder embedding 210 and to generate the output encoder embedding $V_c$ based on a relationship between the phoneme tokens 212P and the grapheme tokens 212G of the input encoder embedding 210. For example, for each phoneme token 212P of the set of phoneme tokens 212P from the input encoder embedding 210, the transformer 220 identifies a respective word of the text input 152 corresponding to the respective phoneme token 212P. The transformer 220 may identify the respective word corresponding to the respective phoneme token 212P based on the word position embedding Ewp for the respective phoneme. For instance, for the first phoneme 212*p* of the input encoder embedding 210, the word position embedding Ewp is an embedding that identifies that the first phoneme token 212P is in the first word of segment A (i.e., the phoneme segment). Once the transformer 220 identifies the respective word corresponding to the respective phoneme token 212P, the transformer 220 determines which grapheme token 212G also belongs with that respective word. In this example, the first phoneme token 212P corresponds to the first word of the input text 152 and the first grapheme token 212G also corresponds to the first word of the input text 151 (e.g., depicted as the first word (WP=1) in segment B (S=B)). Similar to the phoneme token 212P, the transformer 220 may determine that the grapheme token 212G corresponds to the word position of the first phoneme token 212P using the word position embedding E, Ewp for the set of grapheme tokens 212G. For example, the word position embedding E, Ewp1 corresponding to the first phoneme token 212P1 matches or is the same as the word position embedding E, Ewp1 corresponding to the first grapheme token 212G1. By identifying this relationship between a phoneme token 212P and a grapheme token 212P, the transformer 220 represents this relationship as part of the context vector Vc. The transformer 220 may then repeat this process for each input token 212.

In some configurations, the transformer 220 generates each token V of the context vector Vc by representing a particular input token 212 as its relationship to all other input tokens 212. For example, FIG. 2C shows that for the current token step of the input token 212P1, the output token V2 of the transformer 220 accounts for the first phoneme token's relationship to all other input tokens 212. In some implementations, the transformer 220 may be configured to weight or to qualitatively represent the strength of the current token step (e.g., the first phoneme token 212P) to each of the other input tokens 212 such that each other input token 212 has some influence on the output token V2. Here, since the first phoneme token 212P1 has a strong relationship (e.g., a shared embedding E at the word-position level) with the first grapheme token 212G1, the transformer 220 may generate the output token V2 with some representation of this relationship.

Generating each token V of the context vector Vc as a representation of a particular input token's relationship to all other input tokens 212 may be beneficial for different types of TTS models. That is, often there are some TTS situations that have historically needed specialized TTS models or TTS models with a particular architecture to accommodate for their particular TTS tasks. This has generally been true with multi-lingual TTS models or multi-accent TTS models. A multi-lingual TTS model refers to a TTS model that may accommodate for input text 152 from various languages and, accordingly, generate synthesized speech 154 in these various languages. This is in contrast to monolingual (or single language) TTS models. Multi-lingual TTS models tend to be problematic because these TTS models traditionally employed phoneme-based TTS models. Phonemes present a challenge for multi-lingual models because phonemes may have a large overlap across different languages. Therefore, with this overlap that leads to language ambiguity, traditional multi-lingual models had to incorporate an additional language input for the model to be effective. But using an additional language input may have some difficulty when code-switching occurs. Code-switching refers to when a single sentence includes multiple languages. In a code-switching situation, a language input combined with a text input may be unable to identify the multiple languages or which particular tokens correspond to which languages. Stated differently, it is difficult to get an accurate language identifier for each token in a sentence. However, the augmented encoder 202 may resolve these issues because each token V of the context vector Vc is a representation of a particular input token's relationship to all other input tokens 212. Therefore, if one of the input tokens 212 for the input encoder embedding 210 includes a language identifier, that language information will be carried to the respective token V of the output encoder embedding Vc. For instance, FIG. 2C illustrates one of the specialty tokens 212CLS includes a language identifier 214 that is then translated to the second token V2 of the context vector Vc. Although FIG. 2C depicts the language identifier 214 associated with a specialty token 212CLS, the input encoder embedding 210 may be configured such that other input tokens 212 include a language identifier 214. Additionally or alternatively, for a multi-accent TTS model, the identifier 214 may instead be a locale or accent identifier 214.

Besides multi-lingual TTS models, the augmented encoder 202 may also be incorporated into multi-accent TTS models. Multi-accent TTS models have also historically had some challenges. For example, multi-accent TTS models, like multi-lingual TTS models tend to use phoneme-based TTS models. This may be attributed to the fact that alignment issues between phonemes and graphemes for the encoder input had not been resolved. Using the current techniques of the augmented encoder 202, however, now multi-accent TTS models can leverage the use of graphemes to identify locale or accents for the input text 152. With these alignment improvements to represent the relationship between phonemes and graphemes, the augmented encoder 202 may be used in various TTS model, such as monolingual TTS models, single-locale TTS models, multi-lingual TTS models, multi-accent TTS models, attention-based TTS, and duration-based TTS models without much, if any significant modifications. Thus, the augmented encoder 202 may replace encoders used in TTS systems without disrupting the other architecture of these TTS systems.

Figure 3:
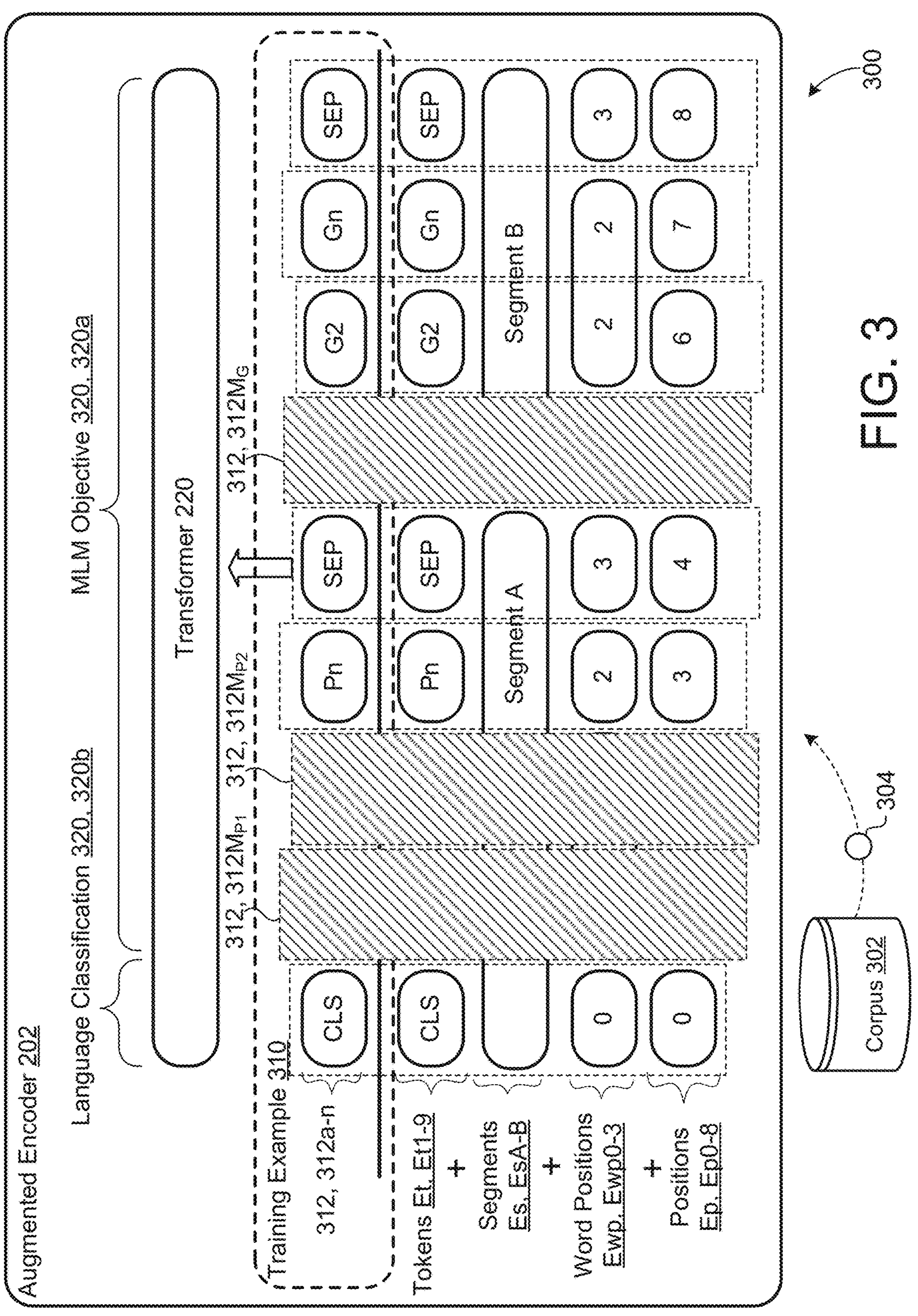
FIG. 3 is a schematic view of an example training process for an augmented encoder.

Referring to FIG. 3, much like the traditional BERT, the augmented encoder 202 undergoes a pre-training process 300. Only here, the pre-training process 300 of the augmented encoder 202 uses both phonemes and graphemes unlike the traditional BERT whose pre-training process uses only graphemes. During the pre-training process, the augment encoder 202 pre-trains on a plain text corpus 302. In some implementations, when training on the plain text corpus 302, the pre-training process 300 obtains the phonemes using a grapheme to phoneme (G2P) conversion system and obtains the graphemes using a subword text tokenizer. In some examples, the pre-training process 300 may vary depending on the type of TTS model 200 that will incorporate the augmented encoder 202. For instance, when pre-training the augmented encoder 202 for monolingual or single-locale TTS models, the pre-training process 200 only uses a single objective 320, or masked language modeling (MLM) objective 320, 320*a*. Generally speaking, when training with a MLM objective 320, 320*a*, some percentage of the input tokens 312, 312*a-n* are masked at random in order to predict the masked input tokens 312M. This masked prediction allows for both right context and left context (i.e., bidirectional context). Yet with the augmented encoder 202, the input content 304 of each training example 310, which corresponds to a sequence of words (i.e., a sentence or sentences), is represented twice-once as a sequence of training phoneme tokens 312, 312*b-d* and once as a sequence of training grapheme tokens 312, 312*f-h*. Here, if the MLM objective 320*a* randomly applied masking to these training token 312, a training token 312 masked in the training phoneme tokens 312*b-d* may have its counterpart present (i.e., not masked) in the training grapheme tokens 312*f-h*; biasing the token prediction process of pre-training. For this reason, the pre-training process 300 with the MLM objective 320*a* instead applies a random masking at the word-level, but makes sure it is consistent between the phoneme and grapheme segments. That is, if the phoneme(s) of a word are masked, then the corresponding graphemes are masked as well. For example, FIG. 3 depicts the two masked phonemes 312, 312$M_{p1,2}$ for the first word of segment A and the one masked grapheme 312, 312 MG for the corresponding first word of segment B (i.e., the complementary grapheme). Alternatively, the MLM objective 320*a* may be implemented using other masking strategies during the pre-training process 300. For instance, the original BERT masking may be applied, but with an increased masking ratio, or the pre-training process 300 applies the masking in a P2G and G2P-like manner where all tokens in one segment (e.g., the grapheme segment-segment B) are masked out while all tokens in the other segment are kept (e.g., the phoneme segment-segment A).

For other TTS models 200, such as multilingual TTS models and multi-accent TTS models, the pre-training process 300 additionally uses a classification objective 320, 320*b*. Here, the pre-training process 300 using the classification objective 320*b* trains the output of the augmented encoder 202 to predict a locale or language. For instance, as described previously, a special token such as the CLS token may carry a language or locale identifier 214. Here, when pre-training, the augmented encoded 202 learns to predict the language or locale and to indicate the language or locale as an identifier associated with a token, such as the CLS token. In some examples, language classification may be easier relative to accent classification. In these example, the classification loss for the classification objective 320*b* may use a lower weight (e.g., 0.1).

Since the pre-training process 300 pre-trains the augmented encoder 202 of the TTS model 200 to learn how to predict input encoder embeddings 210, a fine-tuning process then trains the augmented encoder 202 incorporated into the full TTS model 200 for a particular task. The fine-tuning process initializes the weights from the pre-trained model and then these weights proceed to be further tuned during the TTS model training. In some examples, the fine-tuning freezes the embeddings and lower layers of the transformer 220 while fine-tuning the higher layers of the transformer 220 in order to prevent degradation and promote the generalization of the trained TTS model 200. Degradation may otherwise occur because the fine-tuning process uses a smaller training data set. The fine-tuning process may pass only the hidden states from a final transformer layer on the phoneme tokens 212P downstream to TTS components (e.g., the adapter 204 and the decoder 206). Even though these hidden states only refer to phoneme positions, these hidden states still carry information from the graphemes as well as the language (or locale) based on the way the augmented encoder 202 was trained. In some configurations, the fine-tuning process turns off the MLM objective 320*a*, but yet keeps the classification objective 320*b* active for multilingual or multi-accent TTS models. For instance, by keeping the classification objective 320*b* active during the fine-tuning process, the language information may be maintained in encoded representations.

Figure 4:
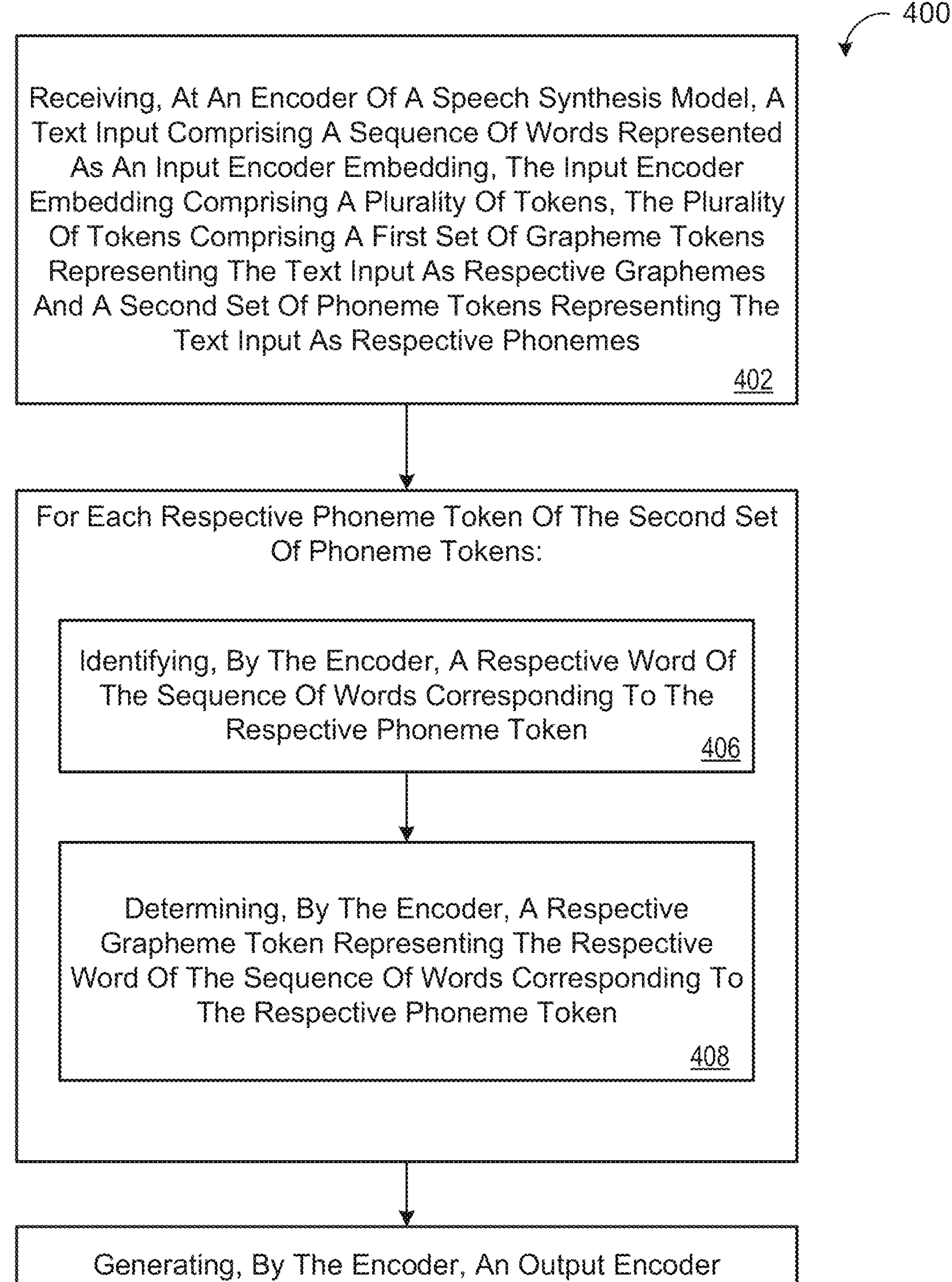
FIG. 4 is a flow chart of an example arrangement of operations for a method of generating an output encoder embedding using both phonemes and graphemes.

FIG. 4 is a flow chart of an example arrangement of operations for a method 400 of generating an output encoder embedding Vc using both phonemes and graphemes. At operation 402, the method 400 receives, at an encoder 202 of a speech synthesis model 200, a text input 152 includes a sequence of words represented as an input encoder embedding 210. The input encoder embedding 210 includes a plurality of tokens 212 where the plurality of tokens 212 includes a first set of grapheme tokens 212, 212G representing the text input 152 as respective graphemes and a second set of phoneme tokens 212, 212P representing the text input 152 as respective phonemes. The method 400 performs operations 404 and 406 for each respective phoneme token 212P of the second set of phoneme tokens 212P. At operations 404, the method 400 identifies a respective word of the sequence of words corresponding to the respective phoneme token 212P. At operation 406, the method 400 determines a respective grapheme token 212G representing the respective word of the sequence of words corresponding to the respective phoneme token 212P. At operation 408, the method 400 generates an output encoder embedding Vc based on a relationship between each respective phoneme token 212P and the corresponding grapheme token 212G determined to represent a same respective word as the respective phoneme token 212P.

Figure 5:
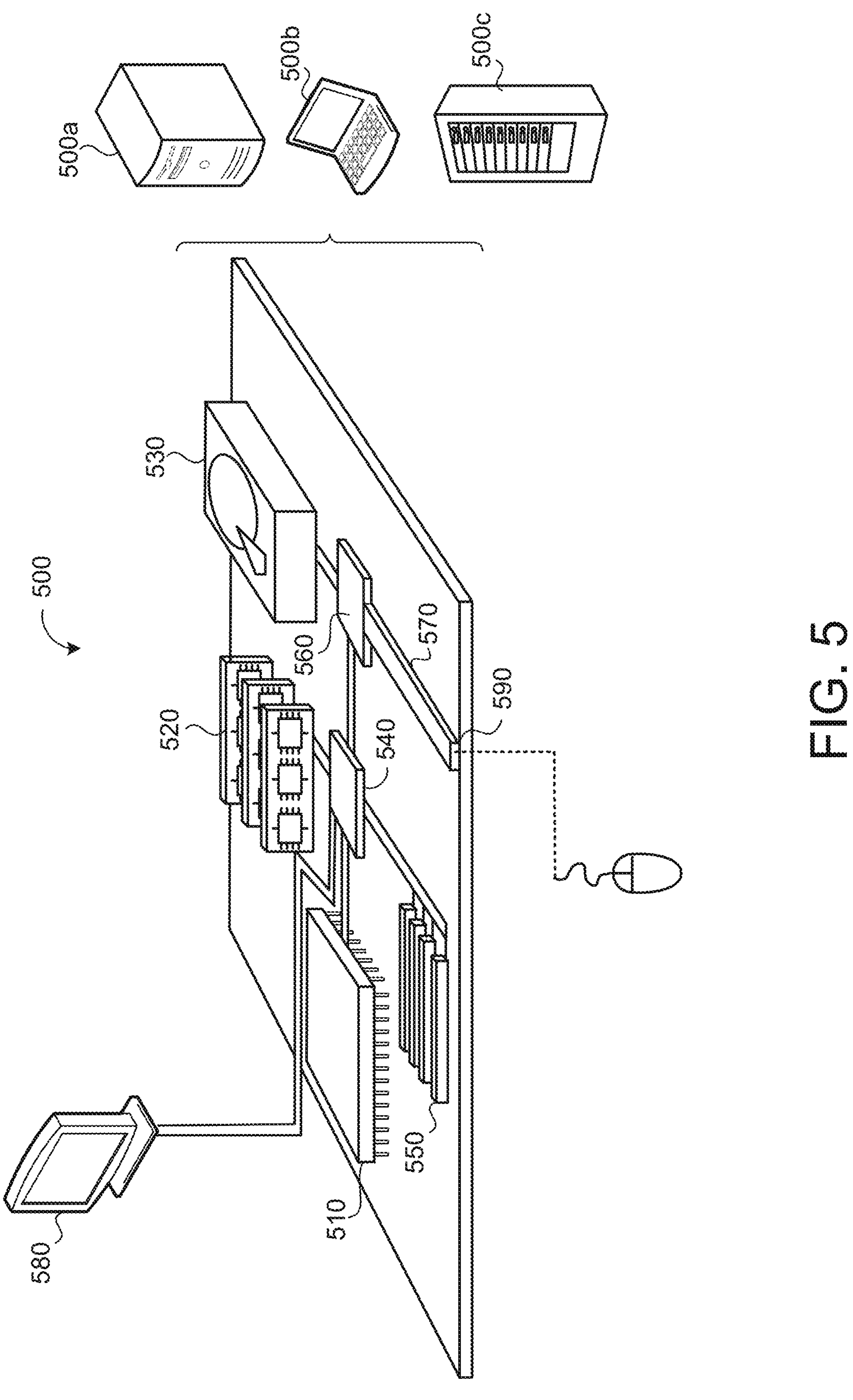
FIG. 5 is a schematic view of an example computing device that may be used to implement the systems and methods described herein.

FIG. 5 is schematic view of an example computing device 500 that may be used to implement the systems (e.g., the TTS system 150, the TTS model 200, and/or the augmented encoder 202) and methods (e.g., the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware causes the data processing hardware to perform operations comprising:

receiving, at an encoder of a speech synthesis model, a text input comprising a sequence of words represented as an input encoder embedding, the input encoder embedding comprising set of grapheme tokens representing the text input as respective graphemes and a set of phoneme tokens representing the text input as respective phonemes, wherein the input encoder embedding represents, for each respective word in the sequence of words, respective sub-word level positions for both one or more of the grapheme tokens from the set of grapheme tokens that correspond to the respective word and one or more of the phoneme tokens from the set of phoneme tokens that correspond to the respective word;

for each respective phoneme token of the set of phoneme tokens:

identifying, by the encoder, a respective word of the sequence of words corresponding to the respective phoneme token; and determining, by the encoder, one or more respective grapheme tokens representing the same respective word of the sequence of words corresponding to the respective phoneme token based on the respective sub-word level position for the respective phoneme token that corresponds to the respective word and the respective sub-word level position for each of the one or more respective grapheme tokens that correspond to the same respective word; and generating, by the encoder, an output encoder embedding for use by a decoder of the speech synthesis model to synthesize speech from the text input, the output encoder embedding based on a relationship between each respective phoneme token and the one or more respective grapheme tokens determined to represent a same respective word as the respective phoneme token.

2. The method of claim 1, wherein the input encoder embedding further represents a combination of:

a segment embedding; and a position embedding.

3. The method of claim 2, wherein the position embedding represents an overall index of position for each grapheme token of the set of grapheme tokens and each phoneme token of the set of phoneme tokens of the input encoder embedding.

4. The method of claim 1, wherein the speech synthesis model comprises an attention mechanism in communication with the encoder.

5. The method of claim 1, wherein the speech synthesis model comprises a duration-based upsampler in communication with the encoder.

6. The method of claim 1, wherein the input encoder embedding further comprises a special token identifying a language of the input text.

7. The method of claim 1, wherein the encoder of the speech synthesis model is pre-trained by:

feeding the encoder a plurality of training examples, each training example represented as a sequence of training grapheme tokens corresponding to a training sequence of words and a sequence of training phoneme tokens corresponding to the same training sequence of words;

masking a training phoneme token from the sequence of training phoneme tokens for a respective word from the training sequence of words; and masking a training grapheme token from the sequence of training phoneme tokens for the respective word from the training sequence of words.

8. The method of claim 1, wherein:

the speech synthesis model comprises a multilingual speech synthesis model; and the encoder of the speech synthesis model is pre-trained using a classification objective to predict a classification token of the input encoder embedding, the classification token comprising a language identifier.

9. The method of claim 1, wherein:

the speech synthesis model comprises a multilingual speech synthesis model; and the output encoder embedding comprises a sequence of encoder tokens, each encoder token comprising language information about the input text.

10. The method of claim 1, wherein:

the speech synthesis model comprises a multi-accent speech synthesis model; and the encoder of the speech synthesis model is pre-trained using a classification objective to predict a classification token, the classification token comprising an accent identifier.

11. A system comprising:

data processing hardware; and memory hardware in communication with the data processing hardware, the memory hardware storing instructions that when executed on the data processing hardware cause the data processing hardware to perform operations comprising:

receiving, at an encoder of a speech synthesis model, a text input comprising a sequence of words represented as an input encoder embedding, the input encoder embedding comprising a set of grapheme tokens representing the text input as respective graphemes and a set of phoneme tokens representing the text input as respective phonemes, wherein the input encoder embedding represents, for each respective word in the sequence of words, respective sub-word level positions for both one or more of the grapheme tokens from the set of grapheme tokens that correspond to the respective word and one or more of the phoneme tokens from the set of phoneme tokens that correspond to the respective word;

for each respective phoneme token of the set of phoneme tokens:

identifying, by the encoder, a respective word of the sequence of words corresponding to the respective phoneme token; and determining, by the encoder, one or more respective grapheme tokens representing the same respective word of the sequence of words corresponding to the respective phoneme token based on the respective sub-word level position for the respective phoneme token that corresponds to the respective word and the respective sub-word level position for each of the one or more respective grapheme tokens that correspond to the same respective word; and generating, by the encoder, an output encoder embedding for use by a decoder of the speech synthesis model to synthesize speech from the text input, the output encoder embedding based on a relationship between each respective phoneme token and the one or more respective grapheme tokens determined to represent a same respective word as the respective phoneme token.

12. The system of claim 11, wherein the input encoder embedding further represents a combination of:

a segment embedding; and a position embedding.

13. The system of claim 12, wherein the position embedding represents an overall index of position for each grapheme token of the set of grapheme tokens and each phoneme token of the set of phoneme tokens of the input encoder embedding.

14. The system of claim 11, wherein the speech synthesis model comprises an attention mechanism in communication with the encoder.

15. The system of claim 11, wherein the speech synthesis model comprises a duration-based upsampler in communication with the encoder.

16. The system of claim 11, wherein the input encoder embedding further comprises a special token identifying a language of the input text.

17. The system of claim 11, wherein the encoder of the speech synthesis model is pre-trained by:

feeding the encoder a plurality of training examples, each training example represented as a sequence of training grapheme tokens corresponding to a training sequence of words and a sequence of training phoneme tokens corresponding to the same training sequence of words;

masking a training phoneme token from the sequence of training phoneme tokens for a respective word from the training sequence of words; and masking a training grapheme token from the sequence of training phoneme tokens for the respective word from the training sequence of words.

18. The system of claim 11, wherein:

the speech synthesis model comprises a multilingual speech synthesis model; and the encoder of the speech synthesis model is pre-trained using a classification objective to predict a classification token of the input encoder embedding, the classification token comprising a language identifier.

19. The system of claim 11, wherein:

the speech synthesis model comprises a multilingual speech synthesis model; and the output encoder embedding comprises a sequence of encoder tokens, each encoder token comprising language information about the input text.

20. The system of claim 11, wherein:

the speech synthesis model comprises a multi-accent speech synthesis model; and the encoder of the speech synthesis model is pre-trained using a classification objective to predict a classification token, the classification token comprising an accent identifier.

* * * * *